(12) United States Patent
Piechowicz

(10) Patent No.: US 9,849,976 B2
(45) Date of Patent: Dec. 26, 2017

(54) NOISE REDUCING PROFILE FOR HELICOPTER ROTOR BLADE TRACKING WEDGES

(71) Applicant: The Boeing Company, Chicago, IL (US)

(72) Inventor: Richard Piechowicz, Scottsdale, AZ (US)

(73) Assignee: The Boeing Company, Chicago, IL (US)

( * ) Notice: Subject to any disclaimer, the term of this patent is extended or adjusted under 35 U.S.C. 154(b) by 282 days.

(21) Appl. No.: 14/462,889

(22) Filed: Aug. 19, 2014

(65) Prior Publication Data

US 2016/0052627 A1    Feb. 25, 2016

(51) Int. Cl.
  *F01D 5/26* (2006.01)
  *B64C 27/467* (2006.01)
  *B64C 27/00* (2006.01)

(52) U.S. Cl.
  CPC .......... *B64C 27/467* (2013.01); *B64C 27/008* (2013.01); *B64C 2230/26* (2013.01); *B64C 2230/28* (2013.01); *Y02T 50/166* (2013.01)

(58) Field of Classification Search
  CPC . B64C 27/467; B64C 27/008; B64C 2230/26; B64C 2230/28; Y02T 50/166
  USPC .................. 416/1, 235, 236 R, 237
  See application file for complete search history.

(56) References Cited

U.S. PATENT DOCUMENTS

| | | | |
|---|---|---|---|
| 5,074,376 A | 12/1991 | Powell | |
| 5,533,865 A * | 7/1996 | Dassen | F03D 1/0608 244/200 |
| 6,733,240 B2 | 5/2004 | Gliebe | |
| 7,976,276 B2 * | 7/2011 | Riddell | F03D 1/0633 416/223 R |
| 7,976,283 B2 * | 7/2011 | Huck | F03D 1/0633 415/119 |
| 8,267,657 B2 * | 9/2012 | Huck | F03D 80/00 416/228 |
| 8,414,261 B2 * | 4/2013 | Bonnet | F03D 1/0641 415/119 |
| 8,430,638 B2 * | 4/2013 | Drobietz | F03D 1/0633 416/132 B |
| 8,834,117 B2 * | 9/2014 | Yarbrough | F03D 11/0033 416/146 R |
| 9,440,737 B1 * | 9/2016 | Cawthorne | B64C 27/615 |
| 2005/0238482 A1 * | 10/2005 | Loftus | B64C 27/008 415/148 |
| 2010/0028151 A1 | 2/2010 | Loftus et al. | |

(Continued)

FOREIGN PATENT DOCUMENTS

EP    1 338 793    8/2003

*Primary Examiner* — Jessica Cahill
(74) *Attorney, Agent, or Firm* — Miller, Matthias & Hull LLP

(57) ABSTRACT

A tracking wedge, a rotor and a method for modifying a movement of air over a tracking wedge. According to aspects of the disclosure, a tracking wedge used to correct the tracking of a helicopter rotor blade may include one or more acoustic management mechanisms. The acoustic management mechanisms may change the manner in which air moves over the surface of the tracking wedge. In some examples, changing the manner in which air moves over the surface of the tracking wedge may reduce noise generated by the use of the tracking wedge.

20 Claims, 6 Drawing Sheets

(56) References Cited

U.S. PATENT DOCUMENTS

| | | | |
|---|---|---|---|
| 2014/0301860 A1* | 10/2014 | Ramm | F01D 5/145 416/231 R |
| 2014/0374566 A1* | 12/2014 | Fernando | B64C 21/10 248/554 |
| 2015/0010407 A1* | 1/2015 | Zamora Rodriguez | F03D 1/0641 416/236 R |

* cited by examiner

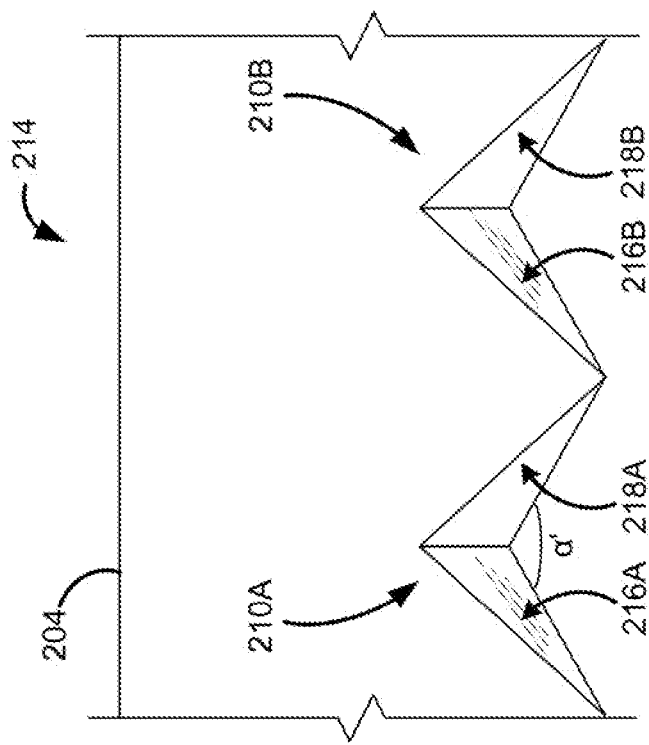
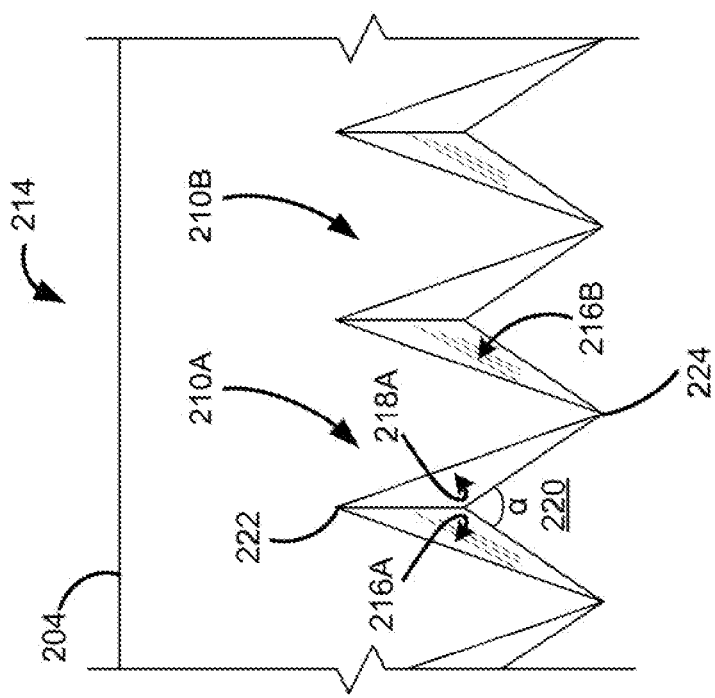
FIG. 2B
FIG. 2A

NOISE REDUCING PROFILE FOR HELICOPTER ROTOR BLADE TRACKING WEDGES

BACKGROUND

During manufacture, a helicopter rotor blade is often tested to ensure that the rotor blade tracks properly. In some examples, a rotor blade tracks properly when the blade has little to no out-of-plane displacement. An out-of-plane displacement may be generally observed when one end of the rotor blade spins in a different rotational plane than the other end of the rotor blade. Even if a rotor blade tracks properly when coming from a manufacturer, the rotor blade may physically change, causing the rotor blade to track improperly.

There are various technologies used to correct the rotor blade to cause the rotor blade to track properly. For example, the rotor blade itself may be modified by having a portion of the rotor blade removed. In another example, one or more trim tabs may be installed on the trailing edge of the rotor blade. In a still further example, a tracking wedge may be installed on the rotor blade. The tracking wedge, along with other modification methods, may be used to change the aerodynamic profile of the rotor blade as well as its weight. The change to the weight and/or aerodynamic profile of the rotor blade may cause the blade to change its tracking, reducing the out-of-plane displacement. However, tracking wedges and other aerodynamic modifications may undesirably induce an increased noise signature associated with the rotor blades.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, a tracking wedge is described. The tracking wedge may include a body configured for attachment to an aerodynamic surface, a leading edge, a trailing edge, and a first acoustic management mechanism. The first acoustic management mechanism may be disposed proximate to the trailing edge of the tracking wedge. The first acoustic management mechanism may have a variable trailing edge configured to modify a movement of air moving over a surface of the tracking wedge.

According to another embodiment disclosed herein, a rotor blade is described. The rotor blade may include a tracking wedge affixed to the rotor blade. The tracking wedge may include a trailing edge and an acoustic management mechanism disposed proximate to the trailing edge of the tracking wedge. The first acoustic management mechanism may be disposed proximate to the trailing edge of the tracking wedge. The acoustic management mechanism may have a variable trailing edge configured to modify a movement of air moving over a surface of the tracking wedge.

According to yet another embodiment disclosed herein, a method of managing an acoustic profile associated with a tracking wedge is described. The method may include operations for rotating a rotor blade about a central axis, routing an effluent airflow over a top surface of the tracking wedge, and modifying a movement of the effluent airflow in a suitable path to reduce noise using an acoustic management mechanism.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein:

FIGS. 2A-2B are illustrations of top-down views of additional aspects of an acoustic management mechanism according to various embodiments disclosed herein.

The plurality of figures presented in this application illustrates variations and different aspects of the embodiments of the present disclosure. Accordingly, the detailed description on each illustration will describe the differences identified in the corresponding illustration.

DETAILED DESCRIPTION

The following detailed description is directed to technologies for a tracking wedge configured with one or more acoustic management mechanism for use on a rotor blade of a helicopter. According to various embodiments, a tracking wedge is described herein with an acoustic management mechanism on the trailing edge of the tracking wedge. In some examples, the acoustic management mechanism is a modification of the trailing edge of the tracking wedge.

The modification may, in some examples, change the manner in which air moves over the tracking wedge, creating a lower noise profile than a similarly configured tracking wedge without the acoustic management mechanism. In other examples, the tracking wedge may include a second acoustic management mechanism on the top surface of the tracking wedge. The second acoustic management mechanism may act in conjunction with other acoustic management mechanisms to create a desired noise profile.

References are made to the accompanying drawings that form a part hereof, and which are shown by way of illustration, specific embodiments, or examples. Like numerals represent like elements through the several figures.

Figure 1:
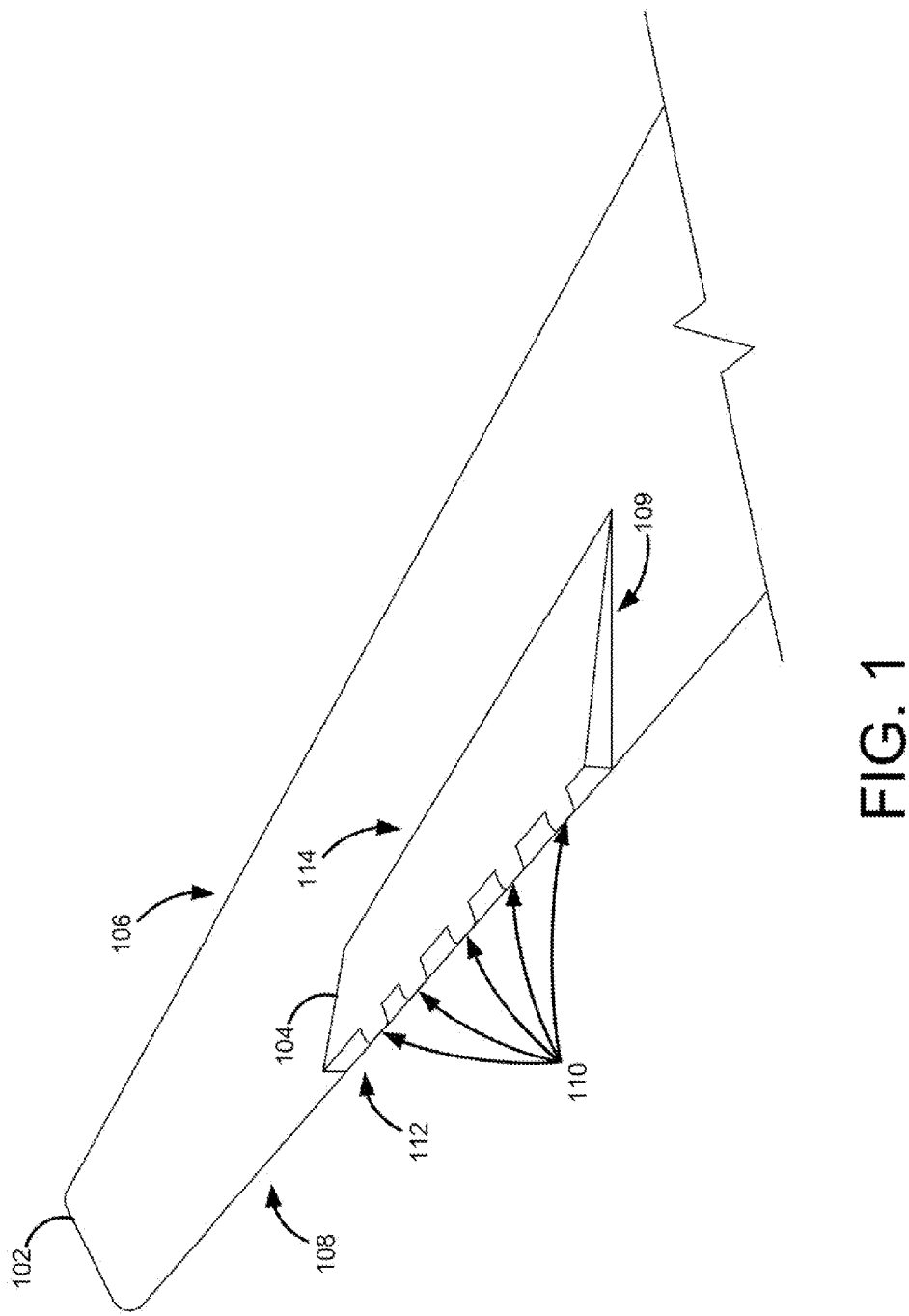
FIG. 1 is a side-perspective diagram of a rotor blade with a tracking wedge installed on one end of the rotor blade according to at least one embodiment disclosed herein.

FIG. 1 is a side-perspective diagram of an end portion of rotor blade 102 with a tracking wedge 104 installed on one end of the rotor blade 102 according to at least one embodiment disclosed herein. The rotor blade 102 may have a leading edge 106 and a trailing edge 108. The leading edge 106 of the rotor blade 102 is the initial point of contact of the rotor blade 102 with air as the rotor blade 102 rotates around a central axis. The trailing edge 108 of the rotor blade 102 is the final point of contact of the rotor blade 102 with air as the rotor blade rotates around a central axis.

As discussed briefly above, during operation, in some conditions, one end of the rotor blade 102 may rotate out-of-plane with another end of the rotor blade 102. In these conditions, the rotor blade 102 is tracking improperly, e.g. the rotor blade 102 has an appreciable out-of-plane displacement. To correct the out-of-plane displacement, the rotor blade 102 may be fitted with the tracking wedge 104 on various locations of the rotor blade 102. The tracking wedge 104 may be used to alter the aerodynamic properties of the rotor blade 102 to correct for improper tracking conditions. The tracking wedge 104 may have a body 109, or other portion, that is configured for attachment to an aerodynamic surface, such as the rotor blade 102, using various technologies. For example, the tracking wedge 104 may be affixed, either removably or permanently, using various bonding agents. In another example, the tracking wedge 104 may be affixed to the rotor blade 102 using fasteners or other securement devices. The body 109 may be a portion or surface of the tracking wedge 104 that is suitable to be affixed to the rotor blade 102. The presently disclosed subject matter is not limited to any particular manner in which the tracking wedge 104 is affixed to the rotor blade 102.

Because the tracking wedge 104 is exposed to airflow moving over the rotor blade 102, the aerodynamic properties of the tracking wedge 104 may create some unintended or undesirable effects. Often, air moving over and from the tracking wedge 104 may generate noise that necessitates correction.

To correct for noise generation, the tracking wedge 104 includes an acoustic management mechanism 110 disposed proximate to the trailing edge 112 of the tracking wedge 104. The acoustic management mechanism 110 may include having a variable trailing edge configured to modify a movement of air moving over a surface of the tracking wedge. As used herein, a tracking wedge has a variable trailing edge if the trailing edge is non-uniform. As used herein, uniform means an edge has no appreciable discontinuities, but rather, is a substantially continuous surface from one end to another distal end. In the example illustrated in FIG. 1, variable trailing edge 112 of the acoustic management mechanism 110 is a series of serrations with voids, the series of serrations with voids being an example of a non-uniform edge. Additional examples of variable trailing edges are provided in the figures provided herein.

The acoustic management mechanism 110, in some examples, may be configured to modify the manner in which air flows over the tracking wedge 104 from a leading edge 114 of the tracking wedge 104 to the trailing edge 112 of the tracking wedge 104. The size and spacing of the acoustic management mechanism 110 may vary depending on the particular application. In some examples, a balance between the number, size, and effect of the acoustic management mechanism 110 and the amount of adjustment necessary to correct for improper tracking may be desirable. Because the acoustic management mechanism 110 changes the manner in which air moves over and from the tracking wedge 104, the effect of the tracking wedge 104 using the acoustic management mechanism 110 to adjust for improper tracking may be changed due to the acoustic management mechanism 110.

In some examples, the acoustic management mechanism 110 may be configured to provide for a desirable downforce to adjust for improper tracking. The acoustic management mechanism 110 may also be configured to modify a movement of effluent airflow in a manner that provides a suitable path to reduce noise for air leaving the tracking wedge 104 than what would be otherwise obtained from a tracking wedge not using the acoustic management mechanism 110. The more suitable path, in some examples, may reduce the amount of disturbance placed on the effluent air moving over and leaving the surface of the tracking wedge 104, which in some examples may reduce the noise generated by the tracking wedge 104.

Figure 2:
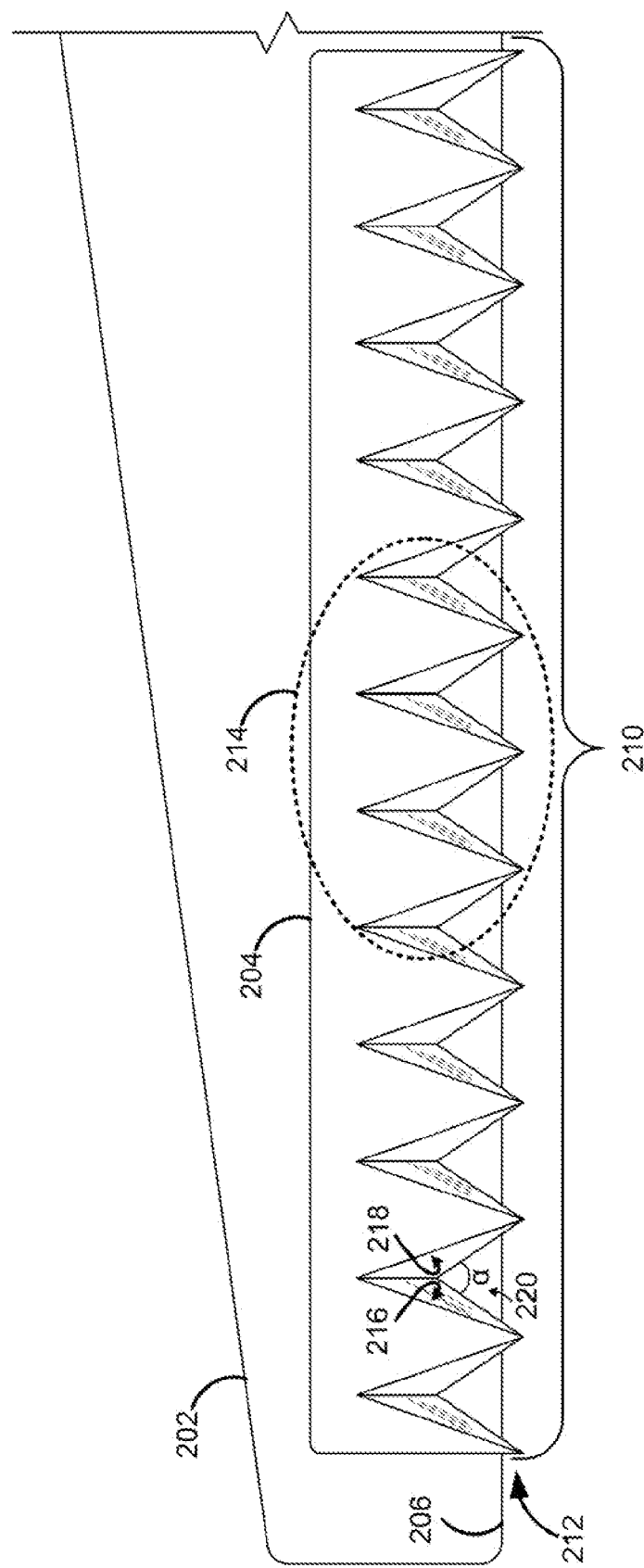
FIG. 2 is an illustration of a top-down view of a rotor blade using a tracking wedge according to at least one embodiment disclosed herein.

FIG. 2 is an illustration of a top-down view of an end portion of a rotor blade 202 using a tracking wedge 204 according to at least one embodiment disclosed herein. The tracking wedge 204 may include acoustic management mechanism 210. The acoustic management mechanism 210 may be generically described as a serrated surface on a trailing edge 212 of the tracking wedge 204. The serrated surface of the trailing edge 212 of the tracking wedge 204 may be created by a series of serrations. In general, according to various embodiments, each serration includes a first surface 216 and a second surface 218, separated by an angle $\alpha$ to create a void 220. Various aspects of a portion 214 of the acoustic management mechanism 210 are explained in more detail in FIGS. 2A and 2B.

In FIG. 2A, an acoustic management mechanism 210A may include a first surface 216A and a second surface 218A. The first surface 216A and the second surface 218A may abut each other at a leading junction 222. The second surface 218A may also abut a first surface 216B of an adjacent serration, acoustic management mechanism 210B, at a trailing junction 224. In this manner, any desired number of serrations may be configured to abut one another at leading junctions 222 and trailing junctions 224 to create the acoustic management mechanism 210 having the desired characteristics. According to this example, the first surface 216A and the second surface 218A may be diverge from each other from the leading junction 222 according to the angle $\alpha$, forming the void 220. The angular displacement $\alpha$ may be varied, as illustrated in more detail in FIG. 2B. In addition, the first surface 216A and the second surface 218A may each be oriented at any angle with respect to a bottom surface of the tracking wedge 204. For example, the first surface 216A and the second surface 218A may extend upwards from the bottom surface at 90-degree angles such that the leading junction 222 creates a vertical line that is normal to the bottom surface of the tracking wedge and each of the first surface 216A and the second surface 218A creates a plane that is normal to the bottom surface. Alternatively, each surface may create a plane that extends from the bottom surface of the tracking wedge 204 at an angle that is not substantially 90 degrees to create a slope from the top surface of the acoustic management mechanism 210 to the bottom surface of the acoustic management mechanism 210.

In some examples, the configuration of the first side 216A and the second side 218A may, among other possible effects, reduce the amount of turbulence created by air as the air moves across the tracking wedge 204. A reduction in turbulence, among other possibilities, may reduce the amount of noise created by the tracking wedge 204 as the tracking wedge 204 moves through the air.

Looking at FIG. 2B, the angular displacement between the first surface 216A and the second surface 218A of the acoustic management mechanism 210A may be defined by angular displacement $\alpha'$. As may be seen in comparing the angular displacement $\alpha'$ illustrated in FIG. 2B with the angular displacement $\alpha$ illustrated in FIG. 2A, the shape of the acoustic management mechanism 210 may be modified to provide for various angles. The shape of the acoustic management mechanism 210 may be modified in other ways. For example, and not by way of limitation, various surfaces of the acoustic management mechanism may be round rather than angular. While the first surface 216 and the second surface 218 are shown to be generally triangular in shape with three sides, these surfaces may have more or less sides to create other shapes. For example, the trailing junctions 224 may have a height that is not substantially planar with a bottom surface of the tracking wedge 204, similar to the leading junctions 222. In this example (not shown), the first surface 216 and the second surface 218 would be generally four-sided. According to another example (not shown), the first surface 216 and the second surface 218 may be curved rather than generally flat, such that the acoustic management mechanism 210 of the tracking wedge 204 curves smoothly from a top surface down the first surface 216 and the second surface 218 to a bottom surface and the trailing junction 224.

Returning to FIG. 2, the number, shape, size and other physical attributes of the acoustic management mechanism 210 may be adjusted for various reasons. For example, the tracking wedge 204 may have a trailing edge 212, which includes the trailing junctions 224 of the acoustic management mechanism 210 described above, that extends beyond a trailing edge 206 of the rotor blade 202. In some examples, this extension of the trailing edge 212 of the tracking wedge 204 beyond the trailing edge 206 of the rotor blade 202 may further decrease the impartation of turbulent forces on the air moving across the tracking wedge 204, thus possibly reducing the amount of noise generated by the tracking wedge 204.

Figure 3:
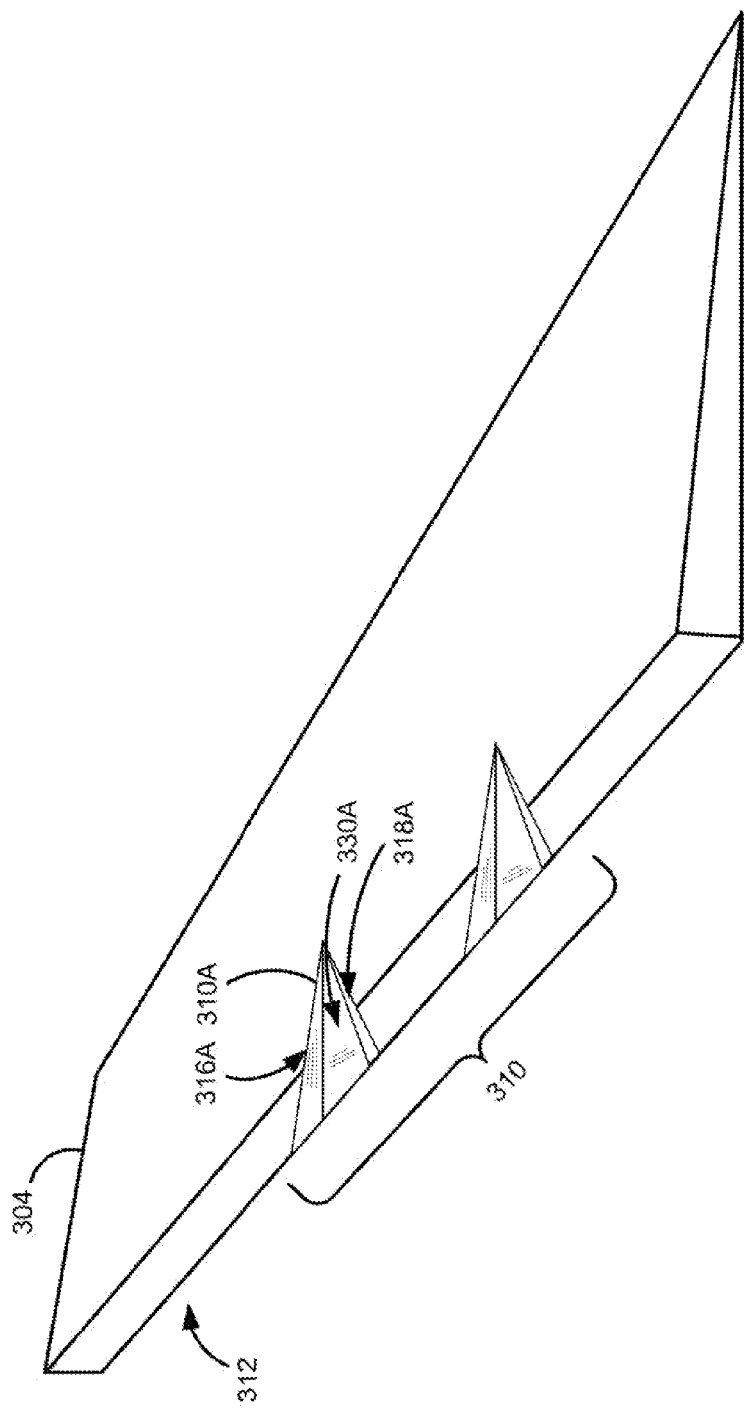
FIG. 3 is an illustration of a side-perspective view of a tracking wedge according to at least one embodiment disclosed herein.

FIG. 3 is an illustration of a side-perspective view of a tracking wedge 304 according to at least one embodiment disclosed herein. The tracking wedge 304 includes acoustic management mechanism 310. The acoustic management mechanism 310 may be a series of serrations on the trailing edge 312 of the tracking wedge 304. An acoustic management mechanism 310A may include a first side 316A and a second side 318A. The first side 316A and the second side 318A may form at a point and create the serration. The acoustic management mechanism 310A includes a lower surface 330A disposed between the first side 316A and the second side 318A.

The acoustic management mechanism 310 is not limited to any particular shape, size, or number. For example, the acoustic management mechanism 310 may be comprised of serrations having rounded surfaces rather than the angular surfaces illustrated in FIG. 3. In another example, the acoustic management mechanism 310A may not include the lower surface 330A. These and other configurations are considered to be within the scope of the presently disclosed subject matter.

Figure 4:
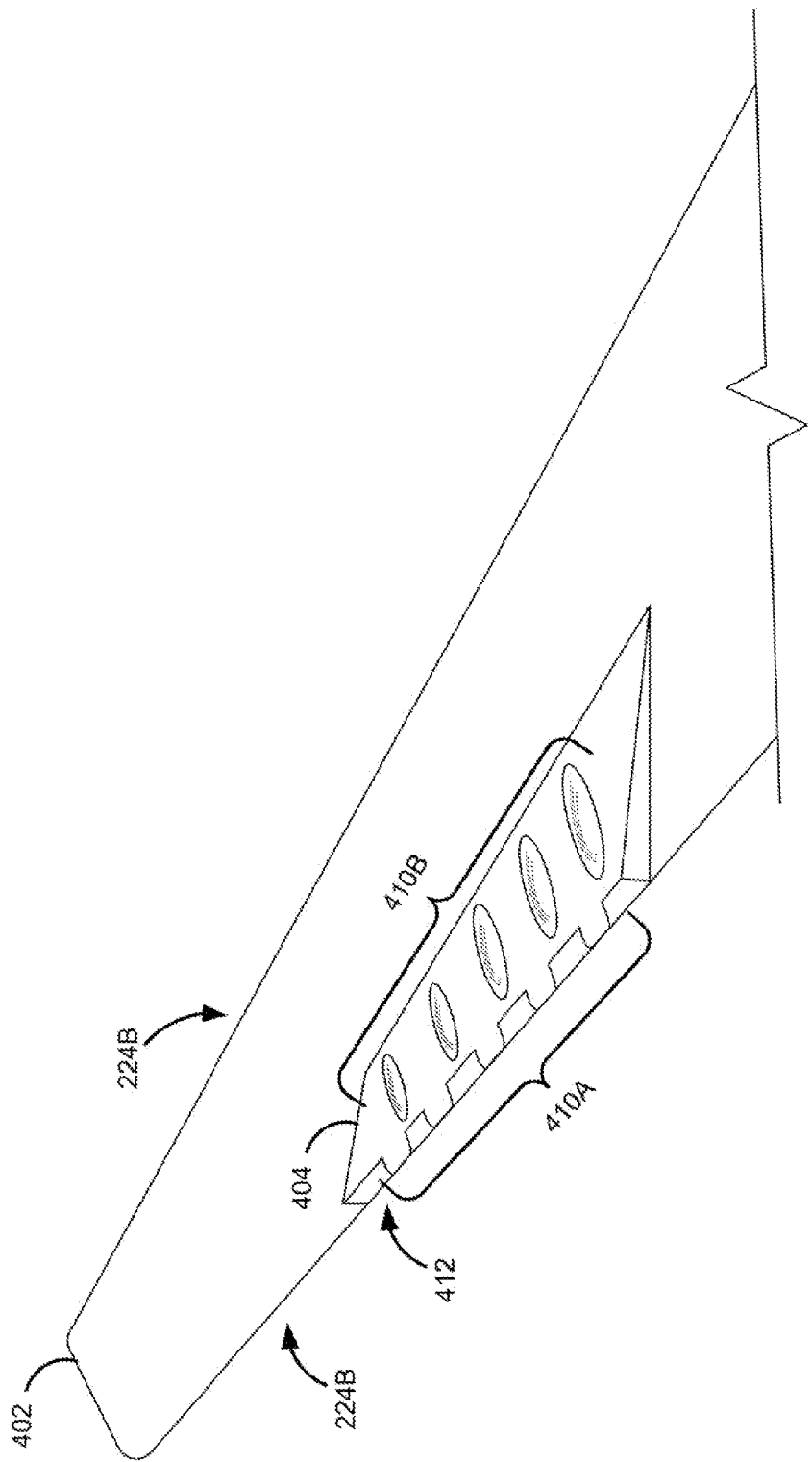
FIG. 4 is a side-perspective diagram of a rotor blade with a tracking wedge installed on one end of the rotor blade according to at least one embodiment disclosed herein.

FIG. 4 is a side-perspective diagram of an end portion of a rotor blade 402 with a tracking wedge 404 installed on one end of the rotor blade 402 according to at least one embodiment disclosed herein. The tracking wedge 404 includes a first acoustic management mechanism 410A and a second acoustic management mechanism 410B. The first acoustic management mechanism 410A comprises a series of serrations on the trailing edge 412 of the tracking wedge 404. The second acoustic management mechanism 410B comprises a series of peaks or valleys formed on the surface of the tracking wedge 404. It should be understood that the presently disclosed subject matter is not limited to any particular number, type, size, shape and other physical attribute of acoustic management mechanism.

The first acoustic management mechanism 410A may act in conjunction with the second acoustic management mechanism 410B to achieve a desired result or to provide enhanced abilities than what otherwise may be achievable without the two or more acoustic management mechanisms 410A or 410B. For example, the second acoustic management mechanism 410B may be configured to shape or modify the flow of the air moving across the surface of the tracking wedge 404 prior to the air coming in contact with the first acoustic management mechanism 410A.

In another example, the second acoustic management mechanism 410B may be used to change the aerodynamic properties of the tracking wedge 404. In this example, the second acoustic management mechanism 410B may be a series of dimples that may change the Reynolds number of the surface of the tracking wedge 404 in a manner similar to the way dimples on a golf ball allow the golf ball to move through the air more efficiently. Conversely, the second acoustic management mechanism 410 may be a series of peaks that perform a similar function.

The second acoustic management mechanism 410B may also be configured to adjust the airflow moving across the surface of the tracking wedge 404 to move the air in a desired pattern. For example, the second acoustic management mechanism 410B may be used to channel or direct airflow to or away from the first acoustic management mechanism 410A. This may change the effect that the first acoustic management mechanism 410A has on the movement of air leaving the trailing edge 412 of the tracking wedge 404. These and other combinations of acoustic management mechanisms 410, including additional acoustic management mechanisms than the two described herein, are considered to be within the scope of the present disclosure.

Figure 5:
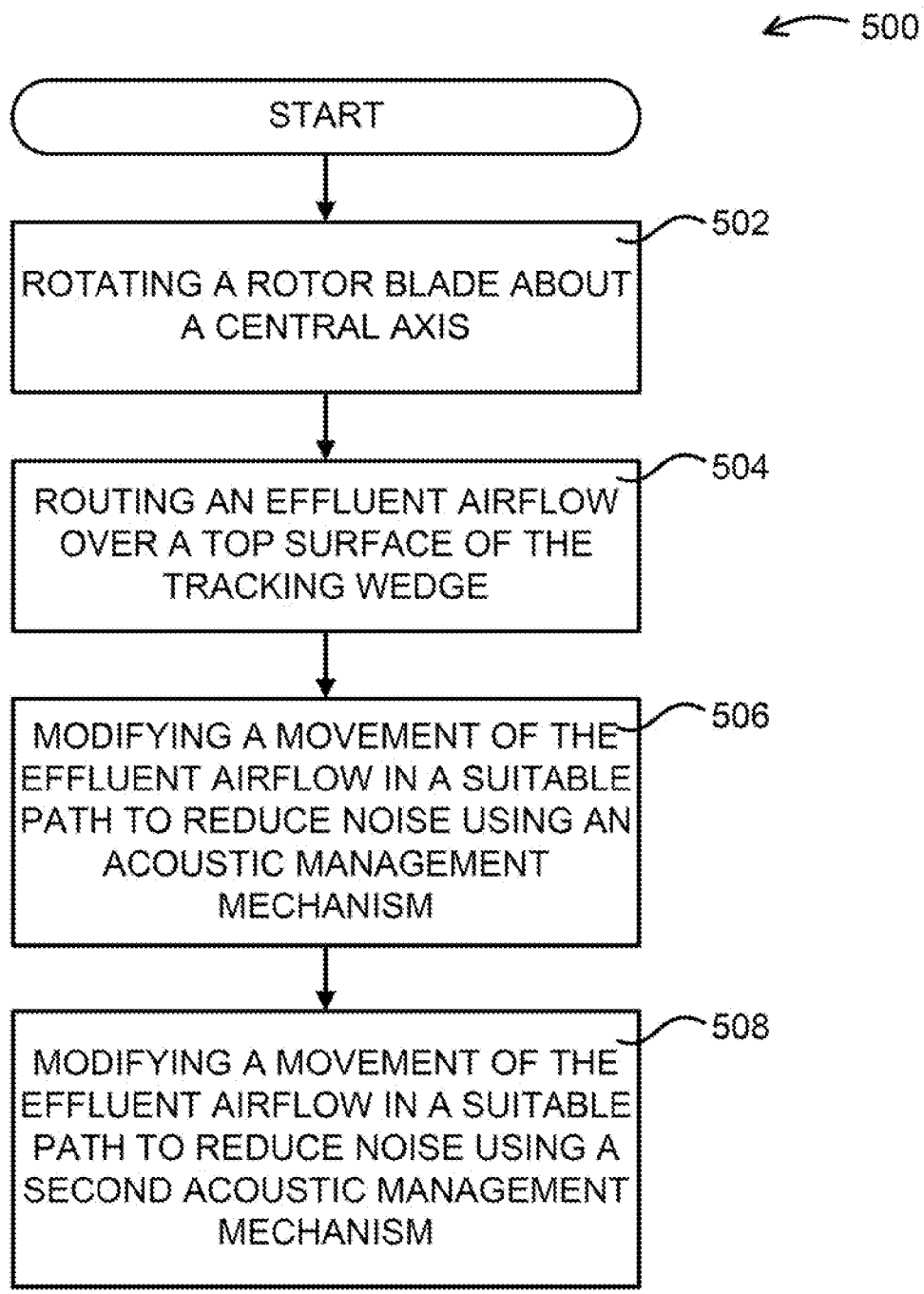
FIG. 5 illustrates one configuration of a routine for modifying the movement of air over a tracking wedge using an acoustic management mechanism according to at least one embodiment disclosed herein.

FIG. 5 illustrates one configuration of a routine 500 for modifying the movement of air over a tracking wedge using an acoustic management mechanism according to at least one embodiment disclosed herein. Unless otherwise indicated, more or fewer operations may be performed than shown in the figures and described herein. Additionally, unless otherwise indicated, these operations may also be performed in a different order than those described herein.

The routine 500 commences at operation 502 ("rotating a helicopter rotor blade about a central axis"), where a helicopter rotor blade is rotated about a central axis. The presently disclosed subject matter is not limited to any particular helicopter/rotor blade configuration, as the presently disclosed subject matter may be used in a variety of applications.

The routine 500 continues to operation 504 ("routing an effluent airflow over a top surface of a tracking wedge"), where an effluent airflow is routed over a top surface of a tracking wedge. The tracking wedge may be affixed to the rotor blade using various techniques, the presently disclosed subject matter not being limited to any particular technique.

The routine 500 continues to operation 506 ("modifying a movement of a movement of the effluent airflow in a suitable path to reduce noise using an acoustic management mechanism"), where a movement of the effluent airflow moving over a surface of the tracking wedge is modified in a suitable path using a first acoustic management mechanism. In some examples, the first acoustic management mechanism comprises one or more serrations. In other examples, at least one of the one or more serrations comprises an end point configured to extend beyond a trailing edge of a helicopter rotor blade. In still further examples, the first acoustic management mechanism is configured to reduce an amount of disturbance placed on the air moving over the surface of the tracking wedge. In still other examples, the first acoustic management mechanism comprises one or more voids.

The routine 500 continues to operation 508 ("modifying a movement of a movement of the effluent airflow in a suitable path to reduce noise using a second acoustic management mechanism"), where a movement of air moving over a surface of the tracking wedge is modified using a second acoustic management mechanism. In some examples, the second acoustic management mechanism is configured to shape a flow of the air moving across the surface of the tracking wedge prior to the air coming in contact with the first acoustic management mechanism. In other examples, the second acoustic management mechanism comprises a series of dimples or a series of peaks. The routine 500 may end thereafter.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A tracking wedge, comprising:
    a wedge-shaped body configured for attachment to an aerodynamic surface;
    a leading edge;
    a trailing edge;
    a plurality of first acoustic management mechanisms disposed proximate to the trailing edge of the tracking wedge, each first acoustic management mechanism of the plurality of first acoustic management mechanisms having a first surface abutting a second surface to create a leading junction, the second surface abutting the first surface of an adjacent first acoustic management mechanism of the plurality of first acoustic management mechanisms to create a trailing junction, and the plurality of first acoustic management mechanisms having a variable trailing edge configured to modify a flow of air moving over a surface of the tracking wedge; and
    a second acoustic management mechanism configured to shape the flow of air moving across the surface of the tracking wedge prior to the air coming in contact with the plurality of first acoustic management mechanisms.

2. The tracking wedge of claim 1, wherein the plurality of first acoustic management mechanisms is configured to reduce an amount of disturbance placed on the air moving over the surface of the tracking wedge.

3. The tracking wedge of claim 1, wherein the plurality of first acoustic management mechanisms comprises one or more voids.

4. The tracking wedge of claim 1, wherein the second acoustic management mechanism comprises a series of dimples.

5. The tracking wedge of claim 1, wherein the second acoustic management mechanism comprises a series of peaks.

6. The tracking wedge of claim 1, wherein the variable edge of the plurality of first acoustic management mechanisms comprises one or more serrations.

7. The tracking wedge of claim 6, wherein at least one of the one or more serrations comprises an end point configured to extend beyond a trailing edge of the aerodynamic surface.

8. The tracking wedge of claim 1, wherein the first surface and the second surface of each first acoustic management mechanism of the plurality of first acoustic management mechanisms extend upwards from a bottom surface of the tracking wedge at a substantially 90 degree angle such that the leading junction creates a vertical line that is normal to the bottom surface of the tracking wedge, and wherein the first surface and the second surface of each first acoustic management mechanism of the plurality of first acoustic management mechanisms create a plane normal to the bottom surface of the tracking wedge.

9. The tracking wedge of claim 8, wherein the first surface and the second surface of each first acoustic management mechanism of the plurality of first acoustic management mechanisms extend from the bottom surface of the tracking wedge at a non-substantially 90 degree angle to create a slope from a top surface to a bottom surface of the plurality of first acoustic management mechanisms.

10. A rotor blade, comprising:
    a tracking wedge affixed to the rotor blade, the tracking wedge comprising:
        a wedge-shaped body;
        a trailing edge;
        a plurality of first acoustic management mechanisms disposed proximate to the trailing edge of the tracking wedge, each first acoustic management mechanism of the plurality of first acoustic management mechanisms having a first surface abutting a second surface to create a leading junction, the second surface abutting the first surface of an adjacent first acoustic management mechanism of the plurality of acoustic management mechanisms to create a trailing junction, and the plurality of first acoustic management mechanisms having a variable trailing edge configured to modify a flow of air moving over a surface of the tracking wedge;
        a second acoustic management mechanism configured to shape the flow of air moving across the surface of the tracking wedge prior to the air coming in contact with the plurality of first acoustic management mechanisms.

11. The rotor blade of claim 10, wherein the plurality of first acoustic management mechanisms is configured to reduce an amount of disturbance placed on the air moving over the surface of the tracking wedge.

12. The rotor blade of claim 10, wherein the second acoustic management mechanism comprises a series of dimples or a series of peaks.

13. The rotor blade of claim 10, wherein the first surface and the second surface of each first acoustic management mechanism of the plurality of first acoustic management mechanisms extend upwards from a bottom surface of the tracking wedge at a substantially 90 degree angle such that the leading junction creates a vertical line that is normal to the bottom surface of the tracking wedge, and wherein the first surface and the second surface of each first acoustic management mechanism of the plurality of first acoustic management mechanisms create a plane normal to the bottom surface of the tracking wedge.

14. The rotor blade of claim 10, wherein the variable edge of the plurality of first acoustic management mechanisms comprises one or more serrations and the one or more serrations include one or more voids.

15. The rotor blade of claim 14, wherein at least one of the one or more serrations comprises an end point configured to extend beyond a trailing edge of the rotor blade.

16. A method of managing an acoustic profile associated with a tracking wedge, comprising:
rotating a rotor blade about a central axis;
routing an effluent airflow over a top surface of the tracking wedge having a wedge-shaped body;
modifying a movement of the effluent airflow in a suitable path to reduce noise using a plurality of first acoustic management mechanisms having a first surface abutting a second surface to create a leading junction, the second surface abutting the first surface of an adjacent first acoustic management mechanism of the plurality of first acoustic management mechanisms to create a trailing junction, and the plurality of acoustic management mechanisms having a variable trailing edge configured for modifying the movement of the effluent air over the tracking wedge; and
modifying a flow of air moving across a surface of the tracking wedge using a second acoustic management mechanism, the second acoustic management mechanism configured to shape the flow of air prior to the air coming in contact with the plurality of first acoustic management mechanisms.

17. The method of claim 16, wherein the second acoustic management mechanism comprises a series of dimples or a series of peaks.

18. The method of claim 16, wherein modifying the movement of the effluent airflow includes the first surface and the second surface of each first acoustic management mechanism of the plurality of first acoustic management mechanisms extending upwards from a bottom surface of the tracking wedge at a substantially 90 degree angle such that the leading junction creates a vertical line that is normal to the bottom surface of the tracking wedge, and wherein the first surface and the second surface of each first acoustic management mechanism of the plurality of first acoustic management mechanisms create a plane normal to the bottom surface of the tracking wedge.

19. The method of claim 16, wherein the plurality of first acoustic management mechanisms comprises one or more serrations configured to reduce an amount of disturbance placed on the air moving over the surface of the tracking wedge.

20. The method of claim 19, wherein at least one of the one or more serrations comprises an end point configured to extend beyond a trailing edge of the rotor blade.

* * * * *